US007751915B2

(12) United States Patent
Roeder et al.

(10) Patent No.: US 7,751,915 B2
(45) Date of Patent: Jul. 6, 2010

(54) DEVICE FOR LEVEL CORRECTION IN A WAVE FIELD SYNTHESIS SYSTEM

(75) Inventors: Thomas Roeder, Rockhausen (DE); Thomas Sporer, Fuerth (DE)

(73) Assignee: Fraunhofer-Gesellschaft zur Foerderung der angewandten Forschung e.V., München (DE)

( * ) Notice: Subject to any disclaimer, the term of this patent is extended or adjusted under 35 U.S.C. 154(b) by 1087 days.

(21) Appl. No.: 11/263,172

(22) Filed: Oct. 31, 2005

(65) Prior Publication Data

US 2006/0109992 A1 May 25, 2006

Related U.S. Application Data

(63) Continuation of application No. PCT/EP2004/005045, filed on May 11, 2004.

(30) Foreign Application Priority Data

May 15, 2003 (DE) ................................ 103 21 986

(51) Int. Cl.

| | |
|---|---|
| ***G06F 17/00*** | (2006.01) |
| ***H04R 5/00*** | (2006.01) |
| ***H04B 1/20*** | (2006.01) |
| ***G11B 3/74*** | (2006.01) |

(52) U.S. Cl. ............................ 700/94; 381/17; 381/18; 369/5; 369/87

(58) Field of Classification Search ............. 381/17–18, 381/119; 369/4–5, 86–87, 91–92
See application file for complete search history.

(56) References Cited

U.S. PATENT DOCUMENTS 5,715,318 A * 2/1998 Hill et al. ...................... 381/17

(Continued)

FOREIGN PATENT DOCUMENTS

DE 197 06 137 8/1998

(Continued)

OTHER PUBLICATIONS

Verheijen, Edwin, "Sound Reproduction by Wave Field Synthesis", Jan. 19, 1998, Technische Universiteit Delft, pp. 50-53, 93-109.*

(Continued)

*Primary Examiner*—Curtis Kuntz
*Assistant Examiner*—Jesse A Elbin
(74) *Attorney, Agent, or Firm*—Beyer Law Group LLP

(57) ABSTRACT

For a level correction in a wave field synthesis system having a wave field synthesis module and an array of loudspeakers for providing sound to a presentation region, a correction value which is based on a set amplitude state in a presentation region is determined, the set amplitude state depending on a position of the virtual source or a type of the virtual source, and the actual amplitude state in the presentation region depending on the component signals for the loudspeakers due to the virtual source. The correction value determined is fed to a manipulator manipulating the audio signal associated to the virtual source before feeding to the wave field synthesis module, or the component signals for the individual loudspeakers due to the virtual source are manipulated to reduce a deviation between a set amplitude state and an actual amplitude state at one point or several in the presentation region.

18 Claims, 8 Drawing Sheets

U.S. PATENT DOCUMENTS

| | | | | |
|---|---|---|---|---|
| 5,798,922 | A * | 8/1998 | Wood et al. | 700/94 |
| 6,205,224 | B1 * | 3/2001 | Underbrink | 381/92 |
| 6,584,202 | B1 | 6/2003 | Montag et al. | |
| 2004/0223620 | A1 * | 11/2004 | Horbach et al. | 381/103 |
| 2005/0041530 | A1 * | 2/2005 | Goudie et al. | 367/138 |

FOREIGN PATENT DOCUMENTS

| | | |
|---|---|---|
| DE | 102 54 404 | 6/2004 |
| JP | 04-132499 | 5/1992 |
| JP | 4-132499 | 5/1992 |
| JP | 675524 | 5/1992 |
| JP | 2001-517005 | 10/2001 |

OTHER PUBLICATIONS

English Translation of International Preliminary Examination Report; PCT/EP2004/005045; date May 11, 2004.

Office Action mail date Jan. 8, 2008 in Japanese application 2006-529782; filed Dec. 25, 2007.

Patent Abstracts of Japan in application 04-132499; date of publication May 6, 1992.

Berkhout A.J.; "Acoustic Control by Wave Field Synthesis"; American Institute of Physics; New York, Bd 93, Nr. 5, 1. May 1993; pp. 2764-2778.

De Vries D. et al.; "Wave Field Synthesis and Analysis Using Array Technology"; Applications of Signal Processing to Audio and Acoustics, 1999 IEEE Workshop on New Paltz, NY; Oct. 17-20, 1999; Piscataway, NJ; pp. 15-18.

De Bruijn, Boone; "Subjective Experiments on the Effects of Combining Spatialized Audio and 2D Video Projection in Audio-Visual Systems"; Audio Engineering Society; May 10, 2002; pp. 1-11.

Boone M.M.; "Acoustic Rendering With Wave Field Synthesis"; ACM Siggraph and Eurographics Campfire; Acoustic Rendering for Virtual Environments; May 29, 2001.

Reiter, F., Melchior, C. Seidel; "Automatisierte Anpassung der Akustik an Virtuelle Raume"; Online Sep. 24, 2001; pp. 1-4.

Theile, G. et al.; "Wellenfieldsynthese, Neue Moeglichkeiten Der Raeumlichen Tonaufnahme Und—Wiedergabe"; Fernseh Und Kinotechnik, Vde Verlag Gmbh., Berlin, Germany pp. 735-739, Considered as of Apr. 2003 (listed on document).

Spors, S., Kuntz, A. and Rabenstein, R.; "Listening Room Compensation for Wave Field Synthesis"; IEEE; Bd. 1, Jul. 6, 2003-Jul. 9, 2003; pp. 725-728. Conference 2003 IEEE International Conference on Multimedia and Expo; Baltimore, MD.

Boone, Marius M. u.a.: "Spatial Sound-Field Reproduction by Wave-Field Synthesis"; U. Audio Eng. Soc., vol. 43, No. 12, Dec. 1995.

De Vries, Diemer; "Sound Reinforcement by Wavefield Synthesis: Adaptation of the Synthesis Operator to the Loudspeaker Directivity Characteristics"; J. Audio Eng. Soc., vol. 44, No. 12, Dec. 1996.

PCT International Search Report (ISA); PCTEP2004/005045; May 11, 2004.

Japanese Office Action dated May 26, 2009; Application No. 2006-529782.

* cited by examiner

DEVICE FOR LEVEL CORRECTION IN A WAVE FIELD SYNTHESIS SYSTEM

CROSS-REFERENCE TO RELATED APPLICATION

This application is a continuation of copending International Application No. PCT/EP04/005045, filed May 11, 2004, which designated the United States and was not published in English, and is incorporated herein, by reference in its entirety.

BACKGROUND OF THE INVENTION

1. Field of the Invention

The present invention relates to wave field synthesis systems and, in particular, to the reduction or elimination of level artifacts in wave field synthesis systems.

2. Description of Prior Art

There is an increasing demand for new technologies and innovative products in the field of entertainment electronics. Thus, it is an important prerequisite for the success of new multimedia systems to offer optimal functionalities and/or abilities. This is achieved by employing digital technologies and, in particular, computer technology. Examples of this are applications offering an improved realistic audio-visual impression. In prior audio systems, an essential weakness is the quality of spatial sound reproduction of natural, but also virtual surroundings.

Methods for a multi-channel loudspeaker reproduction of audio signals have been known for several years and are standardized. All conventional technologies are of disadvantage in that both the location where the loudspeaker is positioned and the position of the listener are already impressed on the transfer format. With a wrong arrangement of the loudspeakers relative to the listener, audio quality suffers considerably. An optimal sound will only be possible in a small region of the reproduction space, the so-called sweet spot.

An improved natural spatial impression and a stronger enclosure in audio reproduction can be obtained using a new technology. The basis of this technology, the so-called wave field synthesis (WFS), was first researched at the Technical University of Delft and first presented in the late 1980ies (A. J. Berkhout; D. de Vries; P. Vogel: Acoustic control by Wave field Synthesis. JASA 93, 1993).

As a consequence of the enormous requirements of this method on computer performance and transfer rates, wave field synthesis has only rarely been employed in practice. Only the progress in the fields of microprocessor technology and audio coding allow this technology to be employed in real applications. First products in the professional area are expected for next year. It is also expected that first wave field synthesis applications for the consumer area will be launched on the market within the next few years.

The basic idea of WFS is based on applying Huygens' Principle of Wave Theory:

Every point detected by a wave is the starting point of an elementary wave propagating in a spherical of circular form.

Applied to acoustics, any form of an incoming wave front can be imitated by a large number of loudspeakers arranged next to one another (a so-called loudspeaker array). In the simplest case of a single point source to be reproduced and a linear arrangement of loudspeakers, the audio signal of every loudspeaker have to be fed with a temporal delay and amplitude scaling so that the sound fields emitted of the individual loudspeakers are superimposed onto one another correctly.

With several sound sources, the contribution to every loudspeaker is calculated separately for every source and the resulting signals are added. In a room having reflecting walls, reflections may also be reproduced as additional sources via the loudspeaker array. The complexity in calculation thus strongly depends on the number of sound sources, the reflection characteristics of the recording space and the number of loudspeakers.

The advantage of this technology in particular is that a natural spatial sound impression is possible over a large region of the reproduction space. In contrast to well-know techniques, the direction and distance of sound sources are reproduced precisely. Virtual sound sources may, to a limited extent, even be positioned between the real loudspeaker array and the listener.

Although wave field synthesis functions well for surroundings the qualities of which are known, irregularities may nevertheless occur when the qualities change or when the wave field synthesis is performed on the basis of an environmental quality not matching the actual quality of the environment.

The wave field synthesis technique, however, may also be employed advantageously to supplement visual perception by a corresponding spatial audio perception. Up to now, obtaining an authentic visual impression of the virtual scene has been given special emphasis in production in virtual studios. The acoustic impression pertaining to the picture is usually impressed subsequently onto the audio signal in the so-called post-production by manual steps or classified as being too complicated and time-intense in its realization and thus neglected. Consequently, the result usually is a contradiction of the individual sensational perceptions resulting in the designed space, i.e. the designed scene, to be perceived as being less authentic.

In the specialist publication "Subjective experiments on the effects of combining spatialized audio and 2D video projection in audio-visual systems", W. de Bruijn and M. Boone, AES convention paper 5582, 10$^{th}$ to 13$^{th}$ May, 2002, Munich, subjective experiments are discussed with regard to the effects of combining spatial audio and a two-dimensional video projection in audio-visual systems. In particular, it is emphasized that two speakers, who are nearly positioned one behind the other, in different distances to a camera can be understood better by an observer when the two persons positioned one behind the other are detected and reconstructed as different virtual sound sources using wave field synthesis. In this case, it has been found out by means of subjective tests that a listener can better understand and differentiate between the two simultaneously speaking speakers when separated.

In a contribution to the conference for the 46$^{th}$ international scientific colloquium in Ilmenau from 24$^{th}$ to 27th Sep., 2001, entitled "Automatisierte Anpassung der Akustik an virtuelle Räume", U. Reiter, F. Melchior and C. Seidel, an approach of automating sound post-processing processes is presented. Here, the parameters of a film set, such as, for example, spatial size, texture of the surfaces or camera position and position of the actors, required for visualization, are checked as to their acoustic relevance, whereupon corresponding control data is generated. Then, this data automatedly influences the effect and post-processing processes used for post-production, such as, for example, adjusting the dependence of the speakers' volume on the distance to the camera or reverberation time in dependence on spatial size and wall quality. Here, the object is to boost the visual impression of a virtual scene for an increased reality sensation.

"Listening with the ears of the camera" is to be made possible to render a scene more real. Here, the highest possible correlation between a sound event position in the picture and a listening event position in the surround field is aimed at. This means that sound source positions should continuously be adjusted to a picture. Camera parameters, such as, for example, the zoom, are to be considered when designing the sound, as well as a position of two loudspeakers L and R. For this, tracking data of a virtual studio are written to a file by the system, together with a pertaining time code. At the same time, picture, sound and time code are recorded by magnetic tape recording. The camdump file is transmitted to a computer generating control data for an audio workstation from it and outputting it via an MIDI interface synchronously with the picture from the magnetic tape recording. The actual audio processing, such as, for example, positioning of the sound source in the surround field and inserting prior reflections and reverberation, takes place within the audio workstation. The signal is prepared for a 5.1 surround loudspeaker system.

Camera tracking parameters and positions of sound sources in the recording setting may be recorded with real film sets. Data of this kind may also be generated in virtual studios.

In a virtual studio, an actor or presenter is alone in a recording room. In particular, he or she stands in front of a blue wall which is also referred to as blue box or blue panel. A pattern of blue and light blue stripes is applied to this blue wall. The peculiarity about this pattern is that the stripes have different widths and thus give a plurality of stripe combinations. Due to the unique stripe combinations on the blue wall, it is possible in post-processing to determine precisely in which direction the camera is directed when the blue wall is replaced by a virtual background. Using this information, the computer can find out the background for the current angle of view of the camera. Additionally, sensors detecting and outputting additional camera parameters are evaluated in the camera. Typical parameters of a camera, detected by means of sensor technology, are the three translation degrees x, y, z, the three rotation degrees, which are also referred to as roll, tilt, pan, and the focal length or zoom equivalent to the information on the opening angle of the camera.

In order for the precise position of the camera to be determined without picture recognition and without complicated sensor technology, a tracking system consisting of several infrared cameras determining the position of an infrared sensor mounted to the camera can be used. Thus, the position of the camera is also determined. Using the camera parameters provided by the sensoric technology and the stripe information evaluated by the picture recognition, a real-time computer can calculate the background for the current picture. Subsequently, the blue color which the background had is removed from the picture so that the virtual background is introduced instead of the blue background.

In most cases, a concept about obtaining an acoustic general impression of the visually pictured setting is aimed at. This may well be described by the term "full shot" coming from picture design. This "full shot" sound impression most often remains constant for all settings of a scene although the optical angle of view on the objects mostly changes significantly. In this way, optical details are emphasized or put into the background by corresponding adjustments. Even countershots in the cinematic design of dialogs are not traced by the sound.

Thus, there is the demand to acoustically embed the audience into an audio-visual scene. Here, the screen or picture area forms the line of vision and the angle of view of the audience. This means that the sound is to follow the picture in the form that it always matches the picture viewed. This is particularly even more important for virtual studios since there is typically no correlation between the sound of the presentation, for example, and the surroundings where the presenter is at that moment. In order to obtain an audio-visual general impression of the scene, a spatial impression matching the rendered picture must be simulated. An essential subjective feature in such a sound concept in this context is the position of the sound source as an observer of, for example, a cinema screen perceives same.

In the audio range, a good spatial sound can be achieved for a great listener range by means of the technique of wave field synthesis (WFS). As has been explained, the wave field synthesis is based on Huygens' Principle according to which wave fronts may be formed and set up by means of superposition of elementary waves. According to a mathematical exact theoretical description, an infinite number of sources in an infinitely small distance would have to be employed in order to generate the elementary waves. In practice, however, a finite number of loudspeakers in a finitely small distance to one another are used. Each of these loudspeakers is controlled, according to the WFS principle, by an audio signal from a virtual source having a certain delay and a certain level. Levels and delays are usually different for all loudspeakers.

As has already been explained, the wave field synthesis system operates on the basis of Huygens' Principle and reconstructs a given wave form of, for example, a virtual source arranged in a certain distance to a show or presentation region or a listener in the presentation region, by a plurality of individual waves. The wave field synthesis algorithm thus receives information on the actual position of an individual loudspeaker from the loudspeaker array to subsequently calculate, for this individual loudspeaker, a component signal this loudspeaker must emit in the end in order for a superposition of the loudspeaker signal from the one loudspeaker on the loudspeaker signals of the other active loudspeakers, for the listener, to perform a reconstruction in that the listener has the impression that he or she is not "irradiated acoustically" by many individual loudspeakers, but only by a single loudspeaker at the position of the virtual source.

For several virtual sources in a wave field synthesis setting, the contribution of each virtual source for each loudspeaker, i.e. the component signal of the first virtual source for the first loudspeaker, of the second virtual source for the first loudspeaker, etc., is calculated to subsequently add the component signals to finally obtain the actual loudspeaker signal. In the case of, for example, three virtual sources, the superposition of the loudspeaker signals of all the active loudspeakers for the listener will result in the listener not having the impression that he or she is irradiated acoustically by a large array of loudspeakers but that the sound he or she hears only comes from three sound sources positioned at special positions which are equivalent to the virtual sources.

The calculation of the component signals in practice is usually performed by the audio signal associated to a virtual source, depending on the position of the virtual source and the position of the loudspeaker at a certain point in time, being provided with a delay and a scaling factor to obtain a delayed and/or scaled audio signal of the virtual source directly representing the loudspeaker signal when only one virtual source is present, or, after being added to further component signals for the respective loudspeaker from other virtual sources, contributing to the loudspeaker signal for the respective loudspeaker.

Typical wave field synthesis algorithms operate independently of how many loudspeakers there are in the loudspeaker array. The theory on which the wave field synthesis is based is that any acoustic field may be reconstructed exactly by an infinitely high number of individual loudspeakers, wherein these individual loudspeakers are arranged infinitely close to one another. In practice, however, neither the infinitely high number nor the infinitely close arrangement can be realized. Instead, there is a limited number of loudspeakers which are additionally arranged in certain predetermined distances from one another. The consequence is that in real systems only an approximation to the actual wave-form can be obtained, which would result if the virtual source were really present, i.e. were a real source.

Additionally, there are different settings in that the loudspeaker array is, when a cinema hall is considered, arranged at, for example, the side of the cinema screen. In this case, the wave field synthesis module would generate loudspeaker signals for these loudspeakers, wherein the loudspeaker signals for this loudspeakers will normally be the same ones as for corresponding loudspeakers in a loudspeaker array not only extending over the side of a cinema, for example, where the screen is arranged but also to the left and right of and behind the audience space. This "360°" loudspeaker array will, of course, provide a better approximation to an exact wave field than only a one-side array, such as, for example, in front of the audience. Nevertheless, the loudspeaker signals for the loudspeakers arranged in front of the audience are the same in both cases. This means that a wave field synthesis module typically does not obtain feedback as to how many loudspeakers there are or whether a one-side or multi-side array or even a 360° array is present or not. Expressed differently, wave field synthesis means calculates a loudspeaker signal for a loudspeaker from the position of the loudspeaker and independently of which other loudspeakers there are or not.

This is an essential strength of the wave field synthesis algorithm in that it may optimally be adapted modularly to different conditions by simply indicating the coordinates of the loudspeakers present in totally different presentation spaces. It is, however, of disadvantage that considerable level artifacts result apart from the poorer reconstruction of the current wave field, which may under certain conditions be accepted. It is not only decisive for a real impression in which direction the virtual source relative to the listener is, but also how loud the listener can hear the virtual source, i.e. which level "reaches" the listener due to a special virtual source. The level reaching a listener, related to a virtual source considered, results from superpositioning the individual signals of the loudspeakers.

If, for example, the case is considered where a loudspeaker array of 50 loudspeakers is in front of the listener and the audio signal of the virtual source is mapped to component signals for the 50 loudspeakers by the wave field synthesis means such that the audio signal is simultaneously emitted by the 50 loudspeakers with different delay and different scaling, a listener of the virtual source will perceive a level of the source resulting from the individual levels of the component signals of the virtual source in the individual loudspeaker signals.

When this wave field synthesis means is used for a reduced array where there are, for example, only 10 loudspeakers in front of the listener, it will be understandable that the level of the signal from the virtual source, resulting at the ear of the listener, has decreased since in a way 40 component signals of the now missing loudspeakers are "missing".

There may also be the alternative case in which there are, for example, at first loudspeakers to the left and right of the listener which are controlled in phase opposition in a certain constellation such that the loudspeaker signal of two opposite loudspeakers neutralize each other due to a certain delay calculated by the wave field synthesis means. If the loudspeakers at one side of the listener are, for example, omitted in a reduced system, the virtual source will suddenly appear to be louder than it should really be.

Whereas constant factors may be considered for stationary sources for level correction, this solution is no longer acceptable when the virtual sources are not stationary but move. It is an essential feature of wave field synthesis that it can also and in particular process moving virtual sources. A correction having a constant factor would not suffice here since the constant factor would be correct for one position, but would have an artifact-increasing effect for another position of the virtual source.

In addition, wave field synthesis means are able to imitate several different kinds of sources. A prominent form of a source is the point source where the level decreases proportionally by 1/r, r being the distance between a listener and the position of the virtual source. Another form of a source is a source emitting plane waves. Here, the level remains constant independently of the distance to the listener, since plane waves may be generated by point sources arranged in an infinite distance.

According to the wave field synthesis theory, in two-dimensional loudspeaker arrangements the level change depending on r, except for a negligible error, matches the natural level change. Depending on the position of the source, different, sometimes considerable errors in the absolute level may result, which result from employing a finite number of loudspeakers instead of the theoretically required infinite number of loudspeakers, as has been explained above.

SUMMARY OF THE INVENTION

It is an object of the present invention to provide a concept for level correction for wave field synthesis systems, which is suitable for moving sources.

In accordance with a first aspect, the present invention provides a device for level correction in a wave field synthesis system having a wave field synthesis module and an array of loudspeakers for providing sound to a presentation region, the wave field synthesis module being formed to receive an audio signal associated to a virtual sound source and source positional information associated to the virtual sound source and to calculate component signals for the loudspeakers due to the virtual source considering loudspeaker positional information, having: means for determining a correction value which is based on a set amplitude state in the presentation region, the set amplitude state depending on a position of the virtual source or a type of the virtual source, and which is also based on an actual amplitude state in the presentation region which is based on the component signals for the loudspeakers due to the virtual source; and means for manipulating the audio signal associated to the virtual source or the component signals using the correction value to reduce a deviation between the set amplitude state and the actual amplitude state.

In accordance with a second aspect, the present invention provides a method for level correction in a wave field synthesis system having a wave field synthesis module and an array of loudspeakers for providing sound to a presentation region, the wave field synthesis module being formed to receive an audio signal associated to a virtual sound source and source positional information associated to the virtual sound source and to calculate component signals for the loudspeakers due to the virtual source considering loudspeaker positional information, having the steps of: determining a correction value which is based on a set amplitude state in the presentation region, the set amplitude state depending on a position of the virtual source or a type of the virtual source, and which is also based on an actual amplitude state in the presentation region which is based on the component signals for the loudspeakers due to the virtual source; and manipulating the audio signal associated to the virtual source or the component signals using the correction value to reduce a deviation between the set amplitude state and the actual amplitude state.

In accordance with a third aspect, the present invention provides a computer program having a program code for performing the above-mentioned method when the program runs on a computer.

The present invention is based on the finding that the deficiencies of a wave field synthesis system having a finite number (which may be realized in practice) of loudspeakers may at least be manipulated by performing a level correction in that either the audio signal associated to a virtual source is manipulated before the wave field synthesis or the component signals for different loudspeakers going back to a virtual source are manipulated after the wave field synthesis, using a correction value, in order to reduce a deviation between a set amplitude state in a presentation region and an actual amplitude state in the presentation region. The set amplitude state results from a set level as an example of a set amplitude state being determined depending on the position of the virtual source and, for example, depending on a distance of a listener or an optimal point in a presentation region to the virtual source and may be taking the type of wave into consideration and additionally an actual level as an example of an actual amplitude state being determined at the listener. Whereas the set amplitude state is determined only on the basis of the virtual source or its position independently of the actual grouping and kind of the individual loudspeakers, the actual amplitude state is calculated taking positioning, type and control of the individual loudspeakers of the loudspeaker array into consideration.

Thus, in one embodiment of the present invention, the sound level at the ear of the listener in the optimal point within the presentation region due to a component signal of the virtual source emitted via an individual loudspeaker may be determined. Correspondingly, the level at the ear of the listener in the optimal point within the presentation region may be determined for the other component signals going back to the virtual source and being emitted by other loudspeakers to obtain the actual level at the ear of the listener by summing up these levels. For this, the transfer function of each individual loudspeaker and the level of the signal at the loudspeaker and the distance of the listener in the point considered within the presentation region to the individual loudspeaker may be taken into consideration. For more simple designs, the transmitting characteristic of the loudspeaker may be assumed as operating as an ideal point source. For more complicated implementations, however, even the directional characteristic of the individual loudspeaker may be taken into consideration.

A considerable advantage of the inventive concept is that in an embodiment in which sound levels are considered, only multiplicative scalings occur in that, for a quotient between the set level and the actual level indicating the correction value, neither the absolute level at the listener nor the absolute level at the virtual source is required. Instead, the correction factor only depends on the position of the virtual source (and thus on the positions of the individual loudspeakers) and the optimal point within the presentation region. With regard to the position of the optimal point and the positions and transmitting characteristics of the individual loudspeakers, these quantities, however, are predetermined fixedly and not dependent on a piece reproduced.

Thus, the inventive concept may be implemented as a lookup table in a calculating time-efficient way in that a lookup table including position-correction factor pairs of values is generated and used, for all the virtual positions or a considerable part of possible virtual positions. In this case, no online set value-determining, actual value-determining and set value/actual value-comparing algorithms need be performed. These maybe calculating time-intense algorithms may be omitted when the lookup table is accessed on the basis of a position of a virtual source, to determine the correction factor applying for this position of the virtual source therefrom. In order to further increase calculating and storage efficiency, it is preferred to only store relatively coarsely screened support value pairs for positions and associated correction factors in the table and to interpolate correction factors for positional values between two support values in a single-sided, two-sided, linear, cubic, etc. way.

Alternatively, it may be sensible in one case or another to use an empirical approach in that level measurements are performed. In such a case, a virtual source having a certain calibration level would be placed at a certain virtual position. Then, a wave field synthesis module would calculate the loudspeaker signals for the individual loudspeakers for a real wave field synthesis system to finally measure the actual level due to the virtual source reaching the listener. A correction factor would then be determined in that it at least reduces or preferably zeros the deviation from the set level to the actual level. This correction factor would then be stored in the lookup table in association to the position of the virtual source to generate piece by piece, i.e. for many positions of the virtual source, the entire lookup table for a certain wave field synthesis system in a special presentation space.

There are several ways for manipulating on the basis of the correction factor. In one embodiment, it is preferred to manipulate the audio signal of the virtual source, as is, for example, recorded in an audio track from a sound studio, by the correction factor to only then feed the manipulated signal into a wave field synthesis module. This in a sense automatically has the result that all the component signals going back to this manipulated virtual source are also weighted correspondingly, compared to the case where no correction according to the present invention is performed.

Alternatively, it may also be favorable for certain cases of application not to intervene in the original audio signal of the virtual source but to intervene in the component signals produced by the wave field synthesis module to manipulate all these component signals preferably by the same correction factor. It is to be pointed out here that the correction factor need not necessarily be identical for all the component signals. This, however, is largely preferred in order not to strongly affect the relative scaling of the component signals with regard to one another which are required for reconstructing the actual wave situation.

An advantage of the present invention is that a level correction may be performed by relatively simple means at least during operation in that the listener will not realize, at least with regard to the volume level of a virtual source he or she perceives, that there is not the actually required infinite number of loudspeakers but only a limited number of loudspeakers.

Another advantage of the present invention is that, even when a virtual source moves in a distance which remains the same with regard to the audience (such as, for example, from left to right), this source will always have the same volume level for the observer who, for example, is sitting in the center in front of the screen, and will not be louder at one instance and softer at another, which would be the case without correction.

Another advantage of the present invention is that it provides the option of offering cheap wave field synthesis systems having a small number of loudspeakers which nevertheless do not entail level artifacts, in particular in moving sources, i.e. have the same positive effect on a listener with regard to the level problems as more complicated wave field synthesis systems having a high number of loudspeakers. Even for holes in the array, levels which might be too low may be corrected according to the invention.

BRIEF DESCRIPTION OF THE DRAWINGS

Preferred embodiments of the present invention will be detailed subsequently referring to the appended drawings, in which.

DESCRIPTION OF PREFERRED EMBODIMENTS

Figure 8:
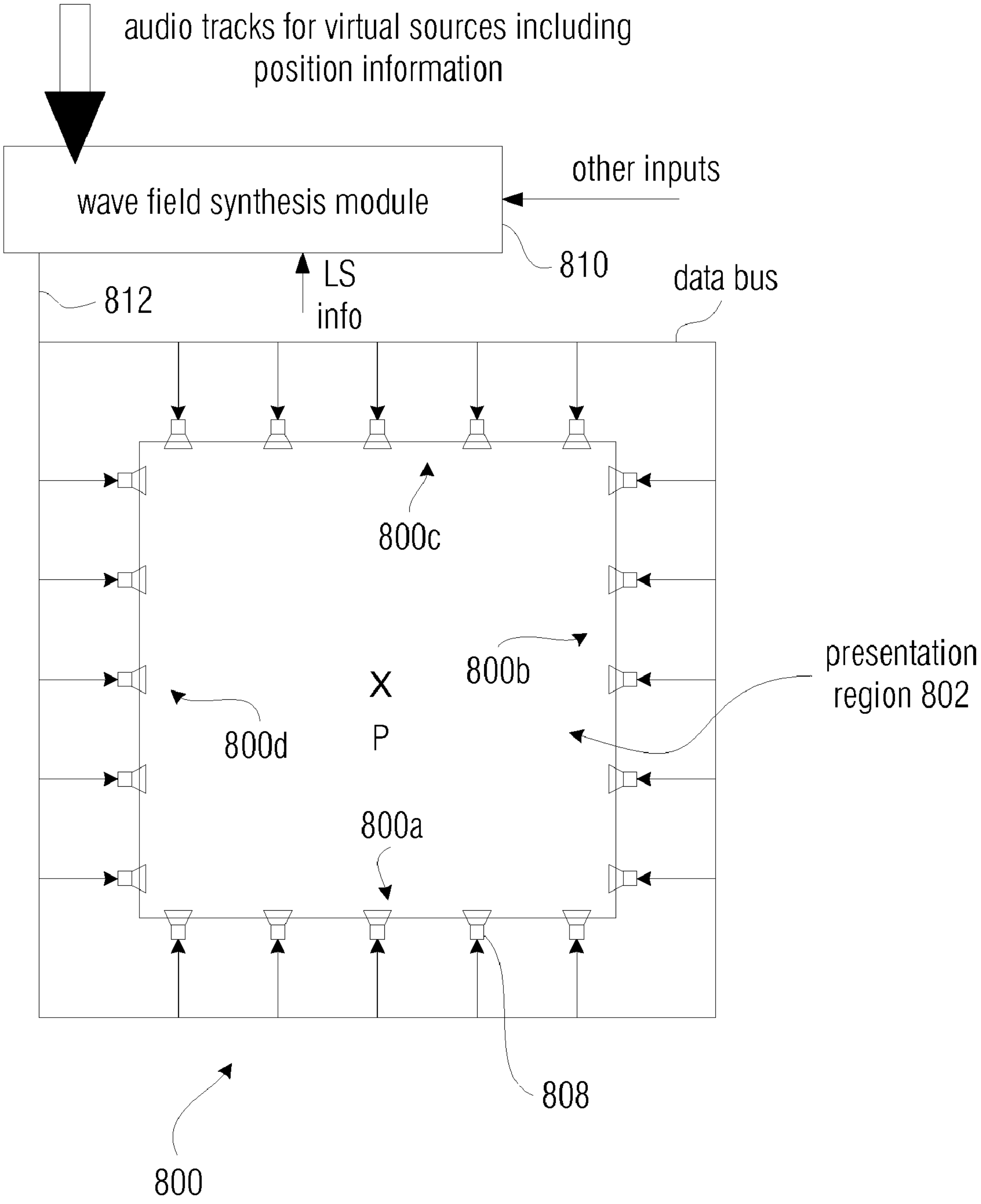
FIG. 8 shows a fundamental block circuit diagram of a wave field synthesis system having a wave field synthesis module and a loudspeaker array in a presentation region.

Before the present invention will be detailed, the fundamental setup of a wave field synthesis system will be illustrated subsequently referring to FIG. 8. The wave field synthesis system comprises a loudspeaker array 800 which is placed relative to a presentation region 802. In particular, the loudspeaker array shown in FIG. 8, which is a 360° array, includes four array sides 800*a*, 800*b*, 800*c* and 800*d*. When the presentation region 802 is, for example, a cinema hall, it is assumed with regard to the conventions front/back or right/left that the cinema screen is at the same side of the presentation region 802 where the sub-array 800*c* is arranged. In this case, the observer sitting at the so-called optimal point P in the presentation region 802, would look to the front, i.e. to the screen. Behind the observer, there would be the sub-array 800*a*, whereas the sub-array 800*d* would be to the left of the observer and the sub-array 800*b* would be to the right of the observer. Every loudspeaker array consists of a number of different individual loudspeakers 808 which are each controlled by their own loudspeaker signals provided by a wave field synthesis module 810 via a data bus 812 which in FIG. 8 is only shown schematically. The wave field synthesis module is formed to calculate, using information on, for example, the type and position of the loudspeakers with regard to the presentation region 802, i.e. loudspeaker information (LS info), and, if applicable, using other inputs, loudspeaker signals for the individual loudspeakers 808 which are each derived from the audio tracks for virtual sources to which position information is also associated, according to the well-known wave field synthesis algorithms. The wave field synthesis module may also receive further inputs, such as, for example, information on room acoustics of the presentation region, etc.

The subsequent explanations of the present invention may principally be performed for any point P in the presentation region. The optimal point may thus be at any position in the presentation region 802. There may also be several optimal points, such as, for example, on an optimal line. In order to obtain the best possible conditions for as many points as possible in the presentation region 802, it is preferred to assume the optimal point or optimal line to be in the middle of or the center of gravity of the wave field synthesis system defined by the loudspeaker sub-arrays 800*a*, 800*b*, 800*c*, 800*d*.

A more detailed illustration of the wave field synthesis module 800 will follow below referring to FIGS. 2 and 3 with regard to the wave field synthesis module 200 in FIG. 2 and the assembly illustrated in detail in FIG. 3, respectively.

Figure 2:
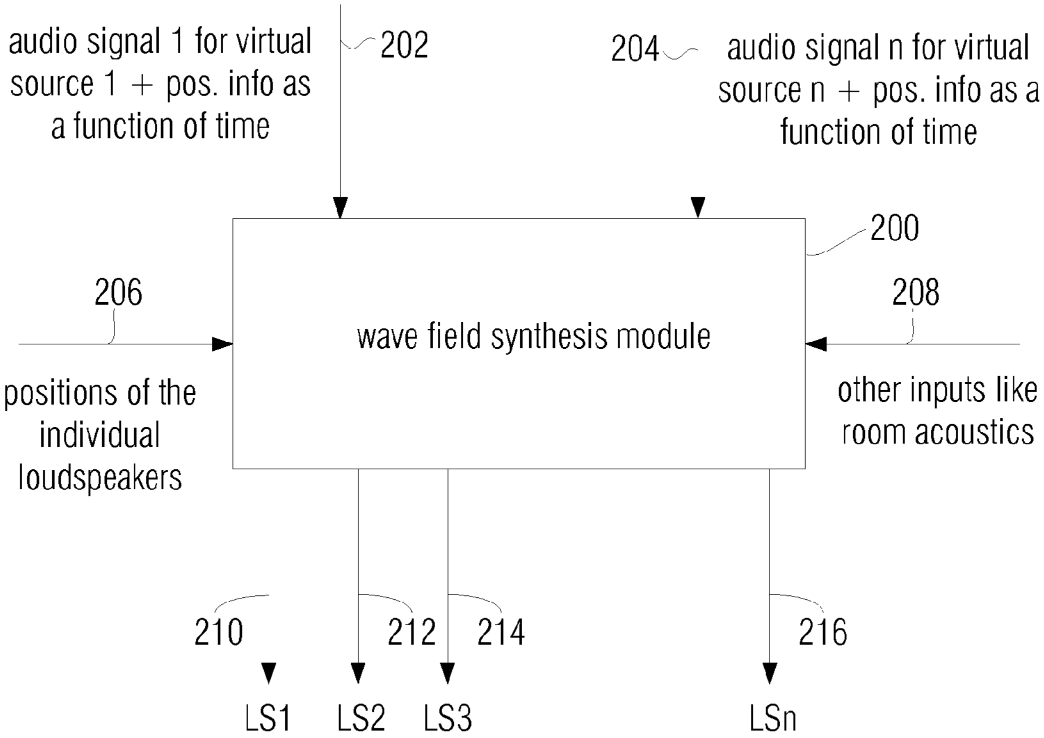
FIG. 2 shows a principle circuit diagram of wave field synthesis surroundings as may be employed for the present invention.

FIG. 2 shows wave field synthesis surroundings where the present invention may be implemented. The center of wave field synthesis surroundings is a wave field synthesis module 200 including diverse inputs 202, 204, 206 and 208 and diverse outputs 210, 212, 214, 216. Different audio signals for virtual sources are supplied to the wave field synthesis module via inputs 202 to 204. The input 202, for example, receives an audio signal of the virtual source 1 and associated positional information of the virtual source. In a cinema setting, for example, the audio signal 1 would, for example, be the speech of an actor moving from a left side of the screen to a right side of the screen and, maybe, additionally moving towards the observer or away from the observer. The audio signal 1 would then be the actual speech of this actor, whereas the positional information, as a function of time, represents the current position, at a certain point in time, of the first actor in the recording setting. The audio signal n in contrast would be the speech of, for example, another actor moving in the same way as or differently from the first actor. The current position of the other actor to whom the audio signal n is associated is communicated to the wave field synthesis module 200 by the positional information synchronized with the audio signal n. In practice, there are different virtual sources depending on the recording setting, wherein the audio signal of every virtual source is fed to the wave field synthesis module 200 as a separate audio track.

As has been explained above, a wave field synthesis module feeds a plurality of loudspeakers LS1, LS2, LS3, LSn by outputting loudspeaker signals via the outputs 210 to 216 to the individual loudspeakers. The positions of the individual loudspeakers in a reproduction setting, such as, for example, a cinema hall, are communicated to the wave field synthesis module 200 via the input 206. In the cinema hall, there are many individual loudspeakers grouped around the cinema audience, the loudspeakers being preferably arranged in arrays such that there are loudspeakers both in front of the audience, that is, for example, behind the screen, and behind the audience and to the right and the left of the audience.

Additionally, other inputs, such as, for example, information on room acoustics, etc., may be communicated to the wave field synthesis module 200 in order to be able to simulate the actual room acoustics during the recording setting in a cinema hall.

Put generally, the loudspeaker signal being fed, for example, to the loudspeaker LS1 via the output 210, is a superposition of component signals of the virtual sources, in that the loudspeaker signal for the loudspeaker LS1 includes a first component going back to the virtual source 1, a second component going back to the virtual source 2, and an $n^{th}$ component going back to the virtual source n. The individual component signals are superpositioned in a linear way, i.e. added after being calculated, to imitate the linear superposition at the ear of the listener who in a real setting will hear a linear superposition of sound sources he or she can perceive.

Subsequently, a detailed design of the wave field synthesis module 200 will be illustrated with reference to FIG. 3. The wave field synthesis module 200 has a strongly parallel setup in that, starting from the audio signal for each virtual source and starting from the positional information for the corresponding virtual source, at first delay information $V_i$ and scaling factors $SF_i$ depending on the positional information (PIi(t), t stands for time) and the position of the loudspeaker being considered, such as, for example, the loudspeaker having the number j, i.e. $LS_j$, are calculated. The calculation of delay information $V_i$ and of a scaling factor $SF_i$ due to the positional information of a virtual source and the position of the loudspeaker j considered takes place by means of well-known algorithms implemented in means 300, 302, 304, 306. On the basis of the delay information $V_i(t)$ and $SF_i(t)$ and on the basis of the audio signal $AS_i(t)$ associated to the individual virtual sources, a discrete value $AW_i(t_A)$ for the component signal $K_{ij}$ in a finally obtained loudspeaker signal is calculated for a current point in time $t_A$. This is performed by means 310, 312, 314, 316, as are schematically illustrated in FIG. 3. FIG. 3 additionally in a sense also shows a "flash shot" at the point in time $t_A$ for the individual component signals. The individual component signals are summed up by a summer 320 to determine the discrete value for the current point in time $t_A$ of the loudspeaker signal for the loudspeaker j which can then be fed to the loudspeaker for the output (such as, for example, the output 214 when the loudspeaker j is loudspeaker LS3).

Figure 3:
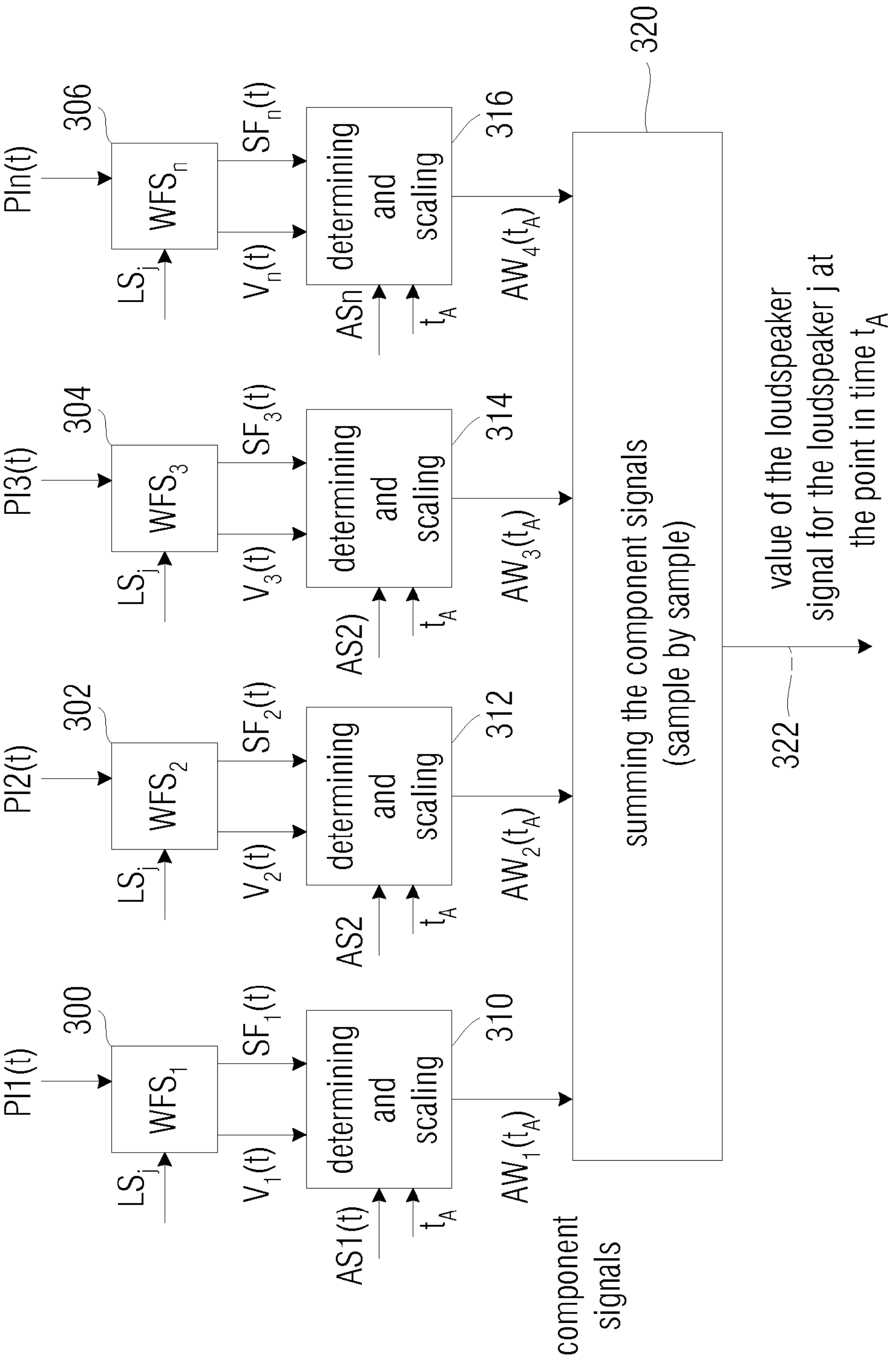
FIG. 3 is a detailed illustration of the wave field synthesis module shown in FIG. 2.

As can be seen from FIG. 3, at first a value valid due to a delay and a scaling by a scaling factor at a current point in time will be calculated, whereupon all the component signals for a loudspeaker due to the different virtual sources are summed. If, for example, there was only one virtual source, the summer would be omitted and the signal at the output of the summer in FIG. 3 would correspond to, for example, the signal output by the means 310 if the virtual source 1 was the only virtual source.

It is pointed out here that, the value of a loudspeaker signal is obtained at the output 322 of FIG. 3, the signal being a superposition of the component signals for this loudspeaker due to the different virtual sources 1, 2, 3, . . . , n. An assembly, as is shown in FIG. 3, would principally be provided for each loudspeaker 808 in the wave field synthesis module 810, unless 2, 4 or 8 loudspeakers next to one another, for example, were always controlled by the same loudspeaker signal, which is preferred for practical reasons.

Figure 1:
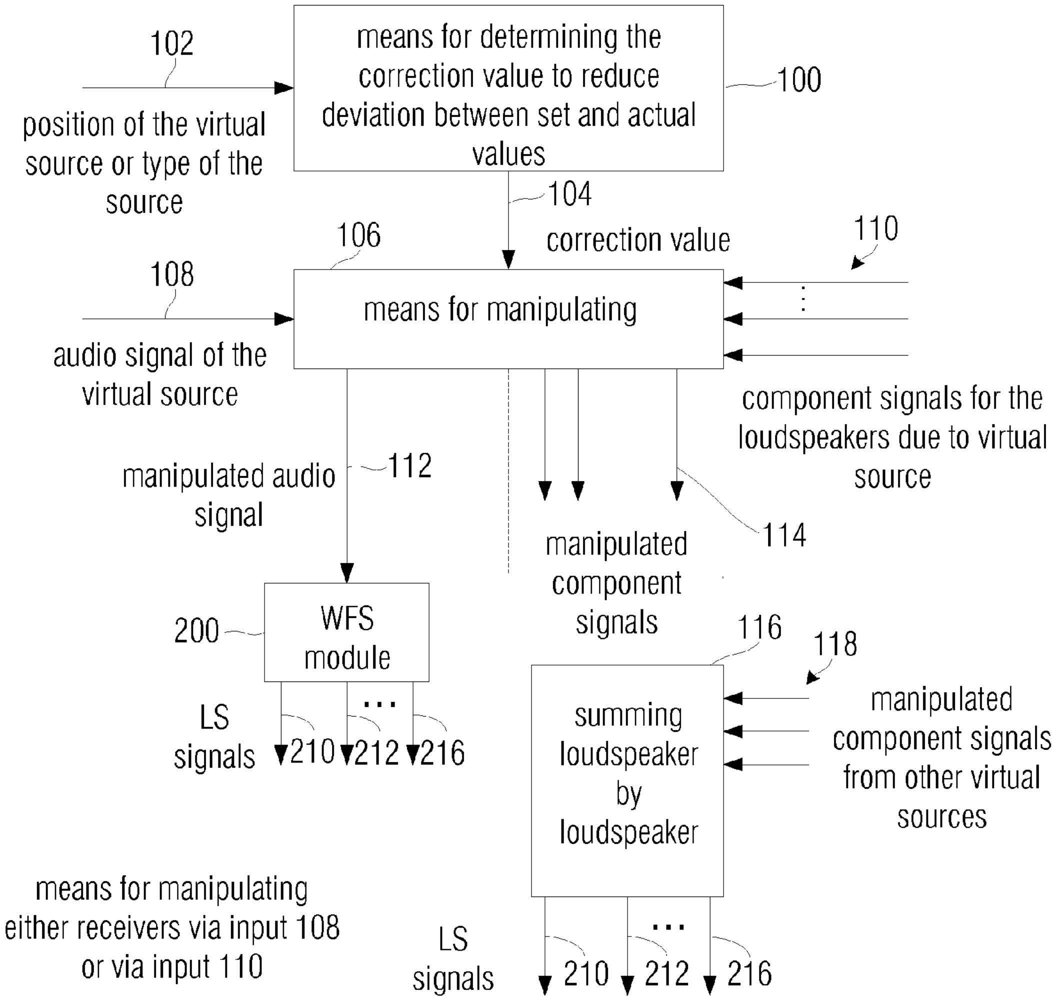
FIG. 1 shows a block circuit diagram of the inventive device for level correction in a wave field synthesis system.

FIG. 1 shows a block circuit diagram of the inventive device for level correction in a wave field synthesis system which has been discussed referring to FIG. 8. The wave field synthesis system includes the wave field synthesis module 810 and the loudspeaker array 800 for providing the sound to the presentation region 802, the wave field synthesis module 810 being formed to receive an audio signal associated to a virtual sound source and source positional information associated to the virtual sound source and to calculate component signals for the loudspeakers due to the virtual source considering loudspeaker positional information. The inventive device includes means 100 for determining a correction value based on a set amplitude state in the presentation region, the set amplitude state depending on a position of the virtual source or a type of the virtual source, and the correction value also being based on a set amplitude state in the presentation region depending on the component signals for the loudspeakers due to the virtual source.

The means 100 has an input 102 for receiving a position of the virtual source when having, for example, a point source characteristic, or for receiving information on a type of the source when the source is, for example, a source for generating plane waves. In this case, the distance of the listener from the source is not required for determining the actual state because, according to the model, the source is in an infinite distance from the listener anyway due to the plane waves generated and has a level which is independent of the position. The means 100 is formed to output, at the output side, a correction value 104 fed to means 106 for manipulating an audio signal associated to the virtual source (received via an input 108) or for manipulating component signals for the loudspeakers due to a virtual source (received via an input 110). If the alternative of manipulating the audio signal provided via the input 108 is performed, the result at an output 112 will be a manipulated audio signal fed, inventively, to the wave field synthesis module 200 instead of the original audio signal provided at the input 108 to generate the individual loudspeaker signals 210, 212, . . . , 216.

If, however, the other alternative for manipulating was used, namely the, in a sense, embedded manipulation of the component signals received via the input 110, manipulated component signals would be received on the output side which must be summed up loudspeaker by loudspeaker (means 116), maybe using manipulated component signals from other virtual sources which are provided via further inputs 118. On the output side, means 116 provides the loudspeaker signals 210, 212, . . . , 216. It is to be pointed out that the alternatives of an upstream manipulation (output 112) or the embedded manipulation (output 114) shown in FIG. 1 may be used alternatively to each other. Depending on the design, there may also be cases where the weighting factor or correction factor provided to the means 106 via the input 104 is, in a sense, split so that partly an upstream manipulation and partly and embedded manipulation are performed.

Regarding FIG. 3, the upstream manipulation would be that the audio signal of the virtual source fed to means 310, 312, 314 or 316 is manipulated before being fed. The embedded manipulation, however, would be that the component signals output by the means 310, 312, 314 or 316 are manipulated before being summed to obtain the actual loudspeaker signal.

Figure 6A:
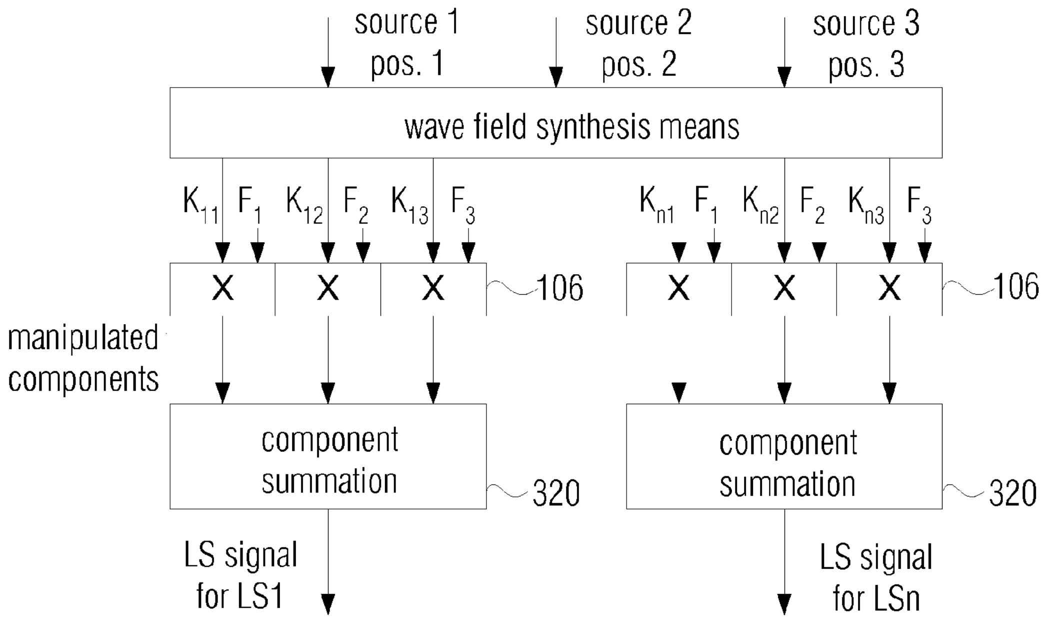
FIG. 6*a* shows a block circuit diagram of a wave field synthesis module having embedded manipulating means for manipulating the component signals.
Figure 6B:
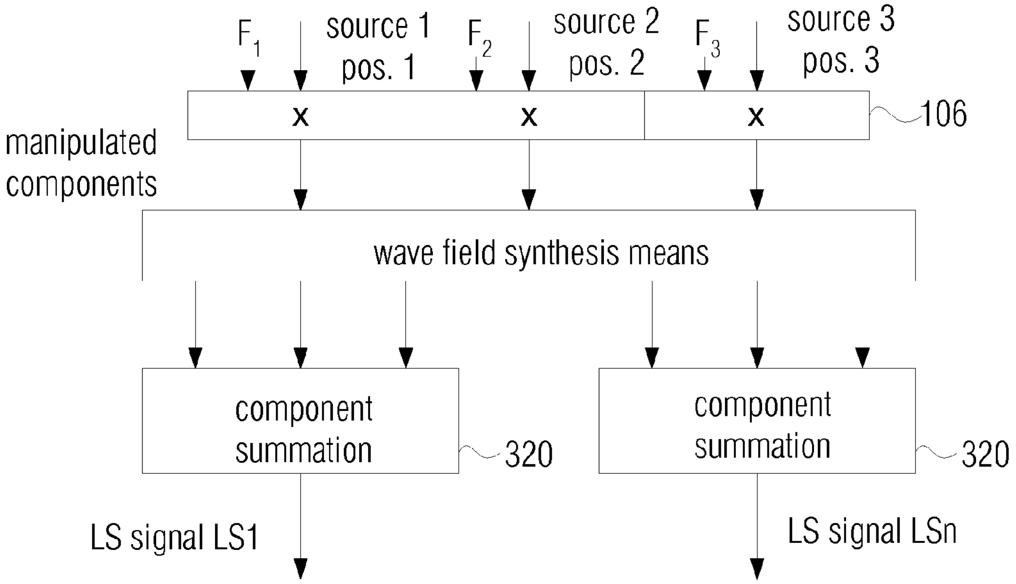
FIG. 6*b* shows a block circuit diagram of another embodiment of the present invention having upstream manipulating means.

These two ways, which may either be used alternatively or accumulatively, are illustrated in FIG. 6*a* and FIG. 6*b*. FIG. 6*a* shows the embedded manipulation by the manipulating means 106 which in FIG. 6*a* is illustrated as a multiplier. Wave field synthesis means which, for example, consists of blocks 300 and 310, or 302 and 312, or 304 and 314, or 306 and 316 of FIG. 3, provides the component signals $K_{11}$, $K_{12}$, $K_{13}$ for the loudspeaker LS1 and the component signals $K_{n1}$, $K_{n2}$ and $K_{n3}$ for the loudspeaker LSn, respectively.

In the notation chosen in FIG. 6*a*, the first index of $K_{ij}$ indicates the loudspeaker and the second index indicates the virtual source from which the component signal comes. The virtual source 1, for example, results in the component signal $K_{11}, \ldots, K_{n1}$. In order to selectively influence the level of the virtual source 1 depending on the positional information of the virtual source 1 (without influencing the level of the other virtual sources), a multiplication of the component signals belonging to source 1, i.e. the component signals the index j of which points to the virtual source 1, by the correction factor $F_1$ will take place in the embedded manipulation shown in FIG. 6*a*. In order to perform a corresponding amplitude or level correction for the virtual source 2, all the component signals going back to the virtual source 2 are multiplied by a correction factor $F_2$ determined for this. Finally, even the component signals going back to the virtual source 3 are weighted by a corresponding correction factor $F_3$.

It is to be pointed out that the correction factors $F_1$, $F_2$ and $F_3$, if all other geometrical parameters are equal, only depend on the position of the corresponding virtual source. If all three virtual sources were, for example, point sources (i.e. of the same type) and were at the same position, the correction factors for the sources would be identical. This rule will be discussed in greater detail referring to FIG. 4 because it is possible to simplify calculating time to use a lookup table having positional information and respective associated correction factors, which must surely be established at one time, but which can be accessed easily in operation without having to continually perform a set value/actual value calculation and comparing operation in operation, which, in principle, is also possible.

FIG. 6*b* shows the inventive alternative to the source manipulation. The manipulation means here is upstream of the wave field synthesis means and is effective to correct the audio signals of the sources by the corresponding correction factors to obtain manipulated audio signals for the virtual sources which are then fed to the wave field synthesis means to obtain the component signals which are then summed by the respective component summing means to obtain the loudspeaker signals LS for the corresponding loudspeakers, such as, for example, the loudspeaker $LS_i$.

In a preferred embodiment of the present invention, the means 100 for determining the directional value is formed as a lookup table 400 storing position-correction factor value pairs. The means 100 is preferably also provided with interpolating means 402 to keep, on the one hand, the table size of the lookup table 400 to a limited extent and to produce, on the other hand, an interpolated current correction factor at an output 408, also for current positions of a virtual source which are fed to the interpolating means via an input 404, at least using one or several neighboring position-correction factor value pairs stored in the lookup table, which are fed to the interpolating means 402 via an input 406. In a simpler version, the interpolating means 402, however, may be omitted so that the means 100 for determining of FIG. 1 performs a direct access to the lookup table using the positional information fed to an input 410 and provides a corresponding correction factor at an output 412. If the current positional information associated to the audio track of the virtual source does not correspond precisely to positional information to be found in the lookup table, a simple rounding down/up function may be associated to the lookup table to take the nearest support value stored in the table instead of the current support value.

It is to be pointed out here that different tables may be designed for different types of sources or that not only one correction factor but several correction factors are associated to a position, each correction factor being connected to a type of source.

Figure 4:
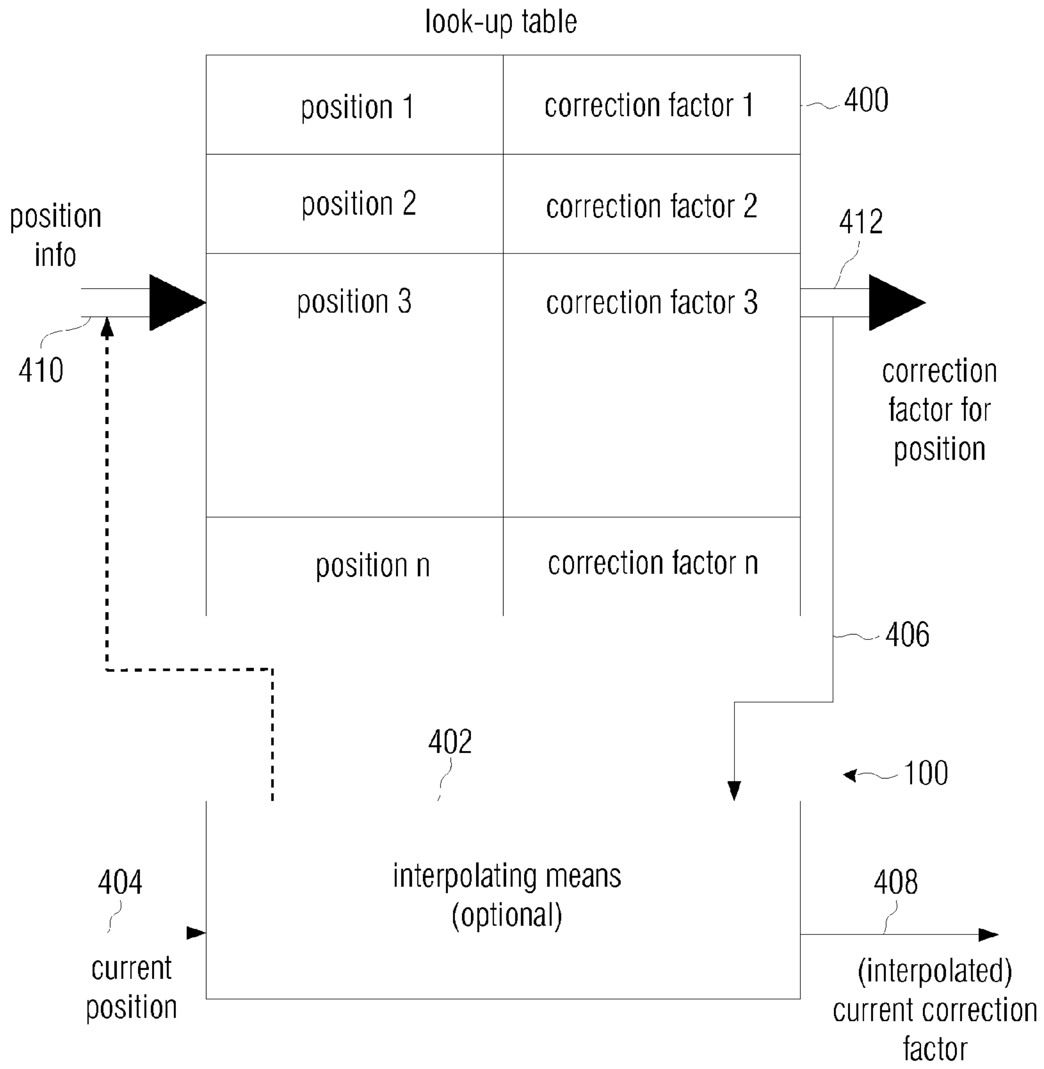
FIG. 4 shows a block circuit diagram of an inventive means for determining the correction value according to an embodiment having a lookup table and, if appropriate, interpolating means.

Alternatively, instead of the lookup table or for "filling" the lookup table in FIG. 4, the means for determining may be designed to actually perform a set value-actual value comparison. In this case, the means 100 of FIG. 1 includes set amplitude state-determining means 500 and actual amplitude state-determining means 502 to provide a set amplitude state 504 and an actual amplitude state 506 which are fed to comparing means 508 which, for example, calculates a quotient from the set amplitude state 504 and the actual amplitude state 506 to generate a correction factor 510 fed to the means 106 for manipulating shown in FIG. 1 for further use. Alternatively, the correction value may also be stored in a lookup table.

Figure 5:
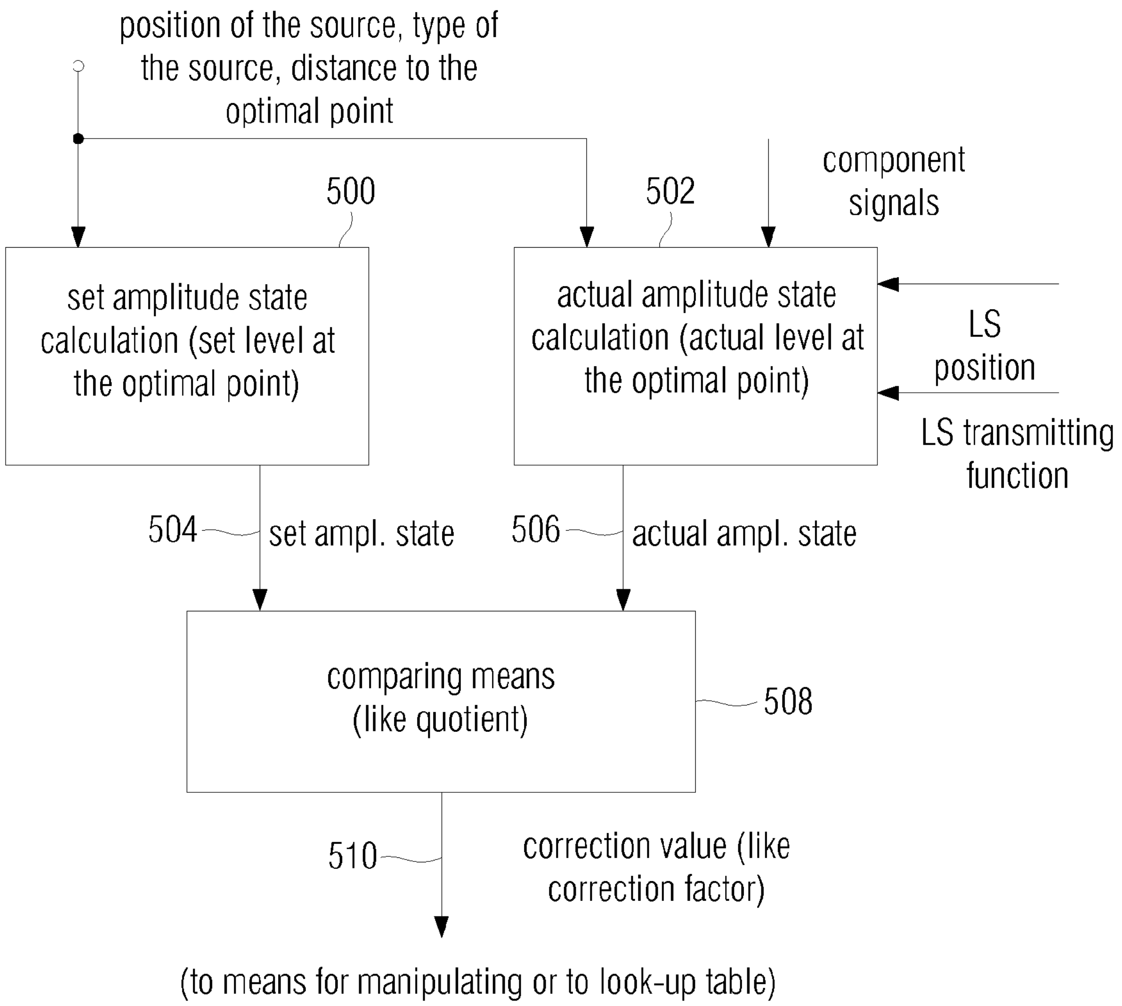
FIG. 5 shows another embodiment of the means for determining of FIG. 1 including a set value/actual value determination and subsequent comparison.

The set amplitude state calculation is formed to determine a set level at the optimal point for a virtual source formed at a certain position and/or in a certain type. For calculating the set amplitude state, the set amplitude state-determining means 500 of course does not require component signals because the set amplitude state is independent of the component signals. Component signals are, as can be seen from FIG. 5, however, fed to the actual amplitude-determining means 502 which may also, depending on the embodiment, obtain information on the loudspeaker positions and information on loudspeaker-transmitting functions and/or information on directing characteristics of the loudspeakers to determine an actual situation in the best way possible. Alternatively, the actual amplitude state-determining means 502 may also be formed as an actual measuring system to determine an actual level situation at the optimal point for certain virtual sources at certain positions.

Figure 7A:
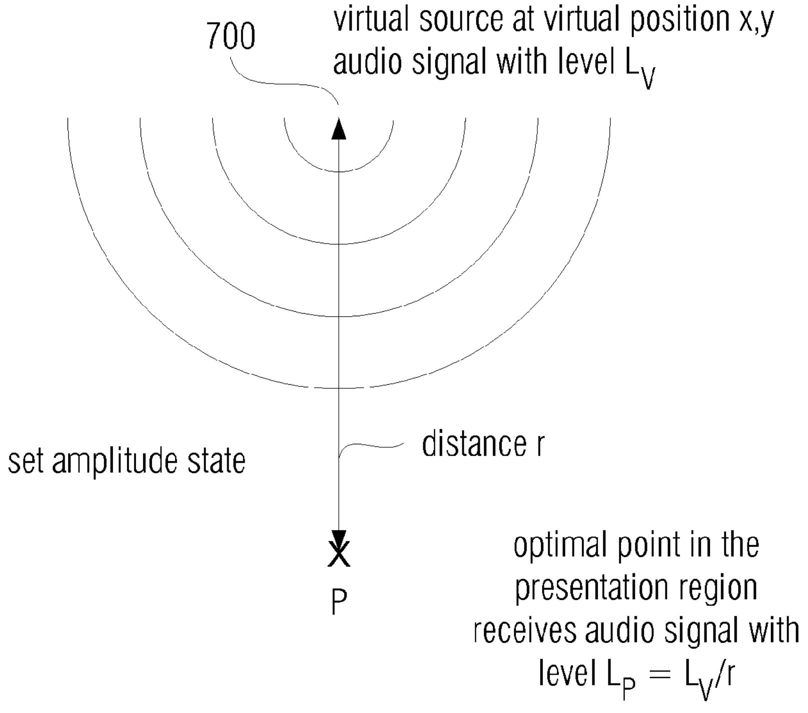
FIG. 7*a* shows a sketch for explaining the set amplitude state at an optimal point in a presentation region.

Subsequently, the actual amplitude state and the set amplitude state will be referred to with reference to FIGS. 7*a* and 7*b*. FIG. 7*a* shows a diagram for determining a set amplitude state at a predetermined point which, in FIG. 7*a*, is referred to as "optimal point" and which is within the presentation region 802 of FIG. 8. In FIG. 7*a*, only exemplarily, a virtual source 700 is indicated as a point source generating an acoustic field having concentric wave fronts. Additionally, the level $L_v$ of the virtual source 700 is known due to the audio signal for the virtual source 700. The set amplitude state or, when the amplitude state is a level state, the set level at the point P in the presentation region is obtained easily by the level $L_p$ at the point P equaling the quotient of $L_v$ and a distance r from the point P to the virtual source 700. The set amplitude state thus can be determined easily by calculating the level $L_v$ of the virtual source and by calculating the distance r from the optimal point to the virtual source. For calculating the distance r, a coordinate transform of the virtual coordinates to the coordinates of the presentation space or a coordinate transform of the presentation space coordinates of the point P to the virtual coordinates must typically be performed, which is known to those skilled in the field of wave field synthesis.

If the virtual source, however, is a virtual source in an infinite distance which generates plane waves at the point P, the distance between the point P and the source will not be required for determining the set amplitude state since same approximates infinity anyway. In this case, only information on the type of the source is required. The set level at the point P then equals the level associated to the plane wave field generated by the virtual source in an infinite distance.

Figure 7B:
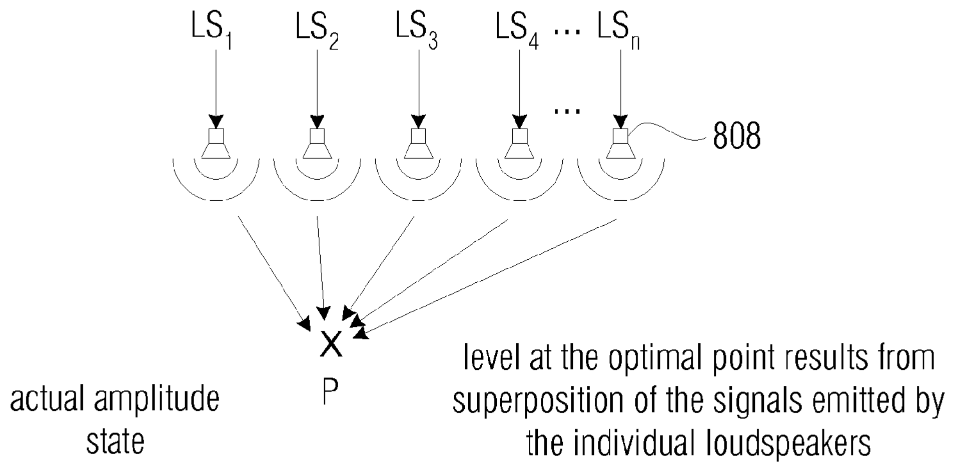
FIG. 7*b* shows a sketch for explaining the actual amplitude state at an optimal point in the presentation region.

FIG. 7 shows a diagram for explaining the actual amplitude state. In particular, different loudspeakers 808 which are all fed by an individual loudspeaker signal having been generated by, for example, the wave field synthesis module 810 of FIG. 8 are indicated in FIG. 7*b*. Additionally, every loudspeaker is modeled as a point source outputting a concentric wave field. The regularity of the concentric wave field is for the level to decrease in accordance with 1/r. Thus, for calculating the actual amplitude state (without measurement), the signal generated by the loudspeaker 808 directly at the loudspeaker membrane or the level of this signal may be calculated on the basis of the loudspeaker characteristics and the component signal in the loudspeaker signal $LS_n$ going back to the virtual source considered. Additionally, the distance between P and the loudspeaker membrane of the loudspeaker $LS_n$ can be calculated using the coordinates of the point P and the positional information on the position of the loudspeaker LSn such that a level for the point P due to a component signal which goes back to the virtual source considered and has been emitted by the loudspeaker LSn may be obtained.

A corresponding procedure may also be performed for the other loudspeakers of the loudspeaker array such that a number of "sub-level values" result for the point P representing a signal contribution of the virtual source considered travelling from the individual loudspeakers to the listener at the point P. By summarizing these sub-level values, the overall actual amplitude state of the point P is obtained, which then, as has been explained, can be compared to the set amplitude state to obtain a correction value which is preferably multiplicative but which may, however, in principle be of an additive or subtractive nature.

According to the invention, the desired level for a point, i.e. the set amplitude state, is calculated on the basis of certain source forms. It is preferred for the optimal point or the point in the presentation region which is considered to be practically in the middle of the wave field synthesis system. It is to be pointed out here that an improvement may be achieved even when the point taken as the basis for calculating the set amplitude state does not directly match the point having been used for determining the actual amplitude state. Since the best possible level artifact reduction for the largest possible number of points in the presentation region is aimed at, it is principally sufficient for a set amplitude state to be determined for any point in the presentation region and for an actual amplitude state to be determined also for any point in the presentation region, wherein it is, however, preferred for the point to which the actual amplitude state is related, to be in a zone around the point for which the set amplitude state has been determined, wherein this zone is preferably smaller than 2 meters for normal cinematic applications. These points should basically coincide for best results.

In an embodiment, the determiner for determining the correction value is formed to calculate the set amplitude state by squaring, sample-by-sample, samples of the audio signal associated to the virtual source and by summing a number of squared samples, the number being a measure of an observation time. Additionally, the determiner for determining the correction value is also formed to calculate the actual amplitude state by squaring every component signal sample-by-sample and by adding a number of squared samples equaling the number of summed squared samples for calculating the set amplitude state, and wherein addition results from the component signals are added to obtain a measure of the actual amplitude state.

Depending on the conditions, the inventive method for level correction, as has been illustrated in FIG. 1, may be implemented either in hardware or in software. The implementation may be on a digital storage medium, in particular on a disc or a CD having control signals which may be read out electronically, which may cooperate with a programmable computer system such that the method will be executed. In general, the invention is also in a computer program product having a program code stored on a machine-readable carrier for performing the method for level correction when the computer program product runs on a computer. Put differently, the invention may also be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Wave field synthesis system comprising:

a wave field synthesis module connectable to an array of loudspeakers for providing sound to a presentation region, the wave field synthesis module being formed to receive a plurality of audio signals for a plurality of virtual sound sources, each audio signal being associated to a virtual sound source, receive source positional information for each virtual sound source, calculate scaling values and delay values for each virtual sound source and for each loudspeaker considering the source positional information for each virtual source and the loudspeaker positional information of the loudspeakers in the array of loudspeakers by using a wave field synthesis algorithm, calculate component signals for the loudspeakers due to each virtual sound source, by applying the calculated scaling values and the calculated delay values to the audio signals of the virtual sound sources, and add, for each loudspeaker in the array of loudspeakers, the component signals for this loudspeaker from each one of the plurality of virtual sound sources, so that a loudspeaker signal for each loudspeaker is obtained to which the plurality of virtual sound sources contribute, and a device for level correction of the audio signals of the virtual sound sources before being input into the wave field synthesis module or for level correction of the component signals for the loudspeakers due to each virtual sound source before being added in the wave field synthesis module, the device for level correction comprising:

a determiner for determining, for each virtual sound source of the plurality of virtual sound sources, a correction value which is based on a set amplitude state in the presentation region, the set amplitude state depending on a position of this virtual sound source or a type of this virtual sound source, and which is also based on an actual amplitude state in the presentation region which is based on the component signals for the loudspeakers due to this virtual sound source as determined by the calculated scaling values and the calculated delay values, whereby the determiner determines a plurality of individual correction values, each correction value being associated with one virtual sound source; and a manipulator for multiplying, for each virtual sound source of the plurality of virtual sound sources, the audio signal associated to the virtual sound source by the correction value associated with this virtual sound source before inputting the audio signal for this virtual sound source into the wave field synthesis module or for multiplying the component signals for this virtual sound source by the correction value associated with this virtual sound source before being added to component signals derived from a different virtual sound source in the wave field synthesis module, whereby a deviation between the set amplitude state and the actual amplitude state for each virtual sound source of the plurality of virtual sound sources is reduced.

2. Wave field synthesis system according to claim 1, wherein the determiner the correction value is formed to calculate the set amplitude state for a predetermined point in the presentation region and to determine the actual amplitude state for a zone in the presentation region, the zone being equal to the predetermined point or extending around the predetermined point within a tolerance range.

3. Wave field synthesis system according to claim 2, wherein the predetermined tolerance range is a sphere having a radius smaller than 2 meters around the predetermined point.

4. Wave field synthesis system according to claim 1, wherein the virtual sound source is a source for plane waves, and wherein the determiner the correction value is formed to determine a correction value where an amplitude state of the audio signal associated to the virtual sound source equals the set amplitude state.

5. Wave field synthesis system according to claim 1, wherein the virtual sound source is a point source, and wherein the means for determining the correction factor is formed to operate on the basis of a set amplitude state equaling a quotient of an amplitude state of the audio signal associated to the virtual sound source and the distance between the presentation region and the position of the virtual sound source.

6. Wave field synthesis system according to claim 1, wherein the determiner the correction value is formed to operate based on an actual amplitude state for the determination of which a loudspeaker-transmitting function of the loudspeaker is considered.

7. Wave field synthesis system according to claim 1, wherein the determiner for determining the correction value is formed to calculate, for each loudspeaker, an attenuation value depending on the position of the loudspeaker and a point to be considered in the presentation region, and wherein the determiner is also formed to weight the component signal of a specific loudspeaker by the attenuation value for the loudspeaker to obtain a weighted component signal, and to additionally sum component signals or corresponding weighted component signals from other loudspeakers than the specific loudspeaker to obtain the actual amplitude state at the point to be considered, wherein the correction value is based on the actual state at the point to be considered.

8. Wave field synthesis system according to claim 1, wherein the manipulator is formed to use the correction value as a correction factor equaling a quotient of the actual amplitude state and the set amplitude state.

9. Wave field synthesis system according to claim 8, wherein the manipulator is formed to scale by the correction factor the audio signal associated to the virtual sound source before calculating the component signal by the wave field synthesis module.

10. Wave field synthesis system according to claim 8, wherein the manipulator is formed to scale component signals at an output of a wave field synthesis means by correction factors.

11. Wave field synthesis system according to claim 10, wherein every component signal going back to the same virtual sound source is scaled by the same correction factor.

12. Wave field synthesis system according to claim 1, wherein the set amplitude state is a set sound level, and wherein the actual amplitude state is an actual sound level.

13. Wave field synthesis system according to claim 12, wherein the set sound level and the actual sound level are based on a set sound intensity and an actual sound intensity, respectively, wherein the sound intensity is a measure of energy associated to a reference area within a period of time.

14. Wave field synthesis system according to claim 12, wherein the determiner the correction value is formed to calculate the set amplitude state by squaring, sample by sample, samples of the audio signal associated to the virtual sound source and by summing a number of squared samples, the number being a measure of an observation time, and wherein the determiner the correction value is also formed to calculate the actual amplitude state by squaring every component signal sample by sample and by adding a number of squared samples equaling the number of summed squared samples for calculating the set amplitude state, and wherein addition results from the component signals being added to obtain a measure of the actual amplitude state.

15. Wave field synthesis system according to claim 1, wherein the determiner the correction value comprises a lookup table where position-correction factor value pairs are stored, wherein a correction factor of a value pair depends on an arrangement of the loudspeakers in the array of loudspeakers and a position of a virtual sound source, and wherein the correction factor is selected such that a deviation between an actual amplitude state due to the virtual sound source at the associated position and a set amplitude state is at least reduced when using the correction factor by the manipulator.

16. Wave field synthesis system according to claim 15, wherein the determiner is further formed to interpolate a current correction factor for a current position of the virtual sound source from one or several correction factors from position-correction factor value pairs, the position or positions of which is/are next to the current position.

17. A method of operating a wave field synthesis system comprising a wave field synthesis module connectable to an array of loudspeakers for providing sound to a presentation region, comprising, in the wave field synthesis module, the following steps:

receiving a plurality of audio signals for a plurality of virtual sound sources, each audio signal being associated to a virtual sound source, receiving source positional information for each virtual sound source, calculating scaling values and delay values for each virtual sound source and for each loudspeaker considering the source positional information for each virtual source and the loudspeaker positional information of the loudspeakers in the array of loudspeakers by using a wave field synthesis algorithm, calculating component signals for the loudspeakers due to each virtual sound source, by applying the calculated scaling values and the calculated delay values to the audio signals of the virtual sound sources, and adding, for each loudspeaker in the array of loudspeakers, the component signals for this loudspeaker from each one of the plurality of virtual sound sources, so that a loudspeaker signal for each loudspeaker is obtained to which the plurality of virtual sound sources contribute, and, wherein the method further comprises the step of level correcting the audio signals of the virtual sound sources before being input into the wave field synthesis module or level correcting the component signals for the loudspeakers due to each virtual sound source before being added in the wave field synthesis module, the step of level correcting comprising:

determining, for each virtual sound source of the plurality of virtual sound sources, the correction value being based on a set amplitude state in the presentation region, the set amplitude state depending on a position of this virtual sound source or a type of this virtual sound source, and the correction value being also based on an actual amplitude state in the presentation region, the amplitude state in the presentation region being based on the component signals for the loudspeakers due to this virtual sound source as determined by the calculated scaling values and the calculated delay values, whereby a plurality of individual correction values are determined, each correction value being associated with one virtual sound source; and multiplying, for each virtual sound source of the plurality of virtual sound sources, the audio signal associated to the virtual sound source by the correction value associated with this virtual sound source before inputting the audio signal for this virtual sound source into the wave field synthesis module or multiplying the component signals for this virtual sound source by the correction value associated with this virtual sound source before being added to other component signals derived from a different virtual sound source in the wave field synthesis module, whereby a deviation between the set amplitude state and the actual amplitude state for each virtual sound source of the plurality of virtual sound sources is reduced.

18. A non-transitory digital storage medium having stored thereon a computer program having a program code for performing the method of operating a wave field synthesis system comprising a wave field synthesis module connectable to an array of loudspeakers for providing sound to a presentation region, comprising, in the wave field synthesis module:

receiving a plurality of audio signals for a plurality of virtual sound sources, each audio signal being associated to a virtual sound source, receiving source positional information for each virtual sound source, calculating scaling values and delay values for each virtual sound source and for each loudspeaker considering the source positional information for each virtual source and the loudspeaker positional information of the loudspeakers in the array of loudspeakers by using a wave field synthesis algorithm, calculating component signals for the loudspeakers due to each virtual sound source, by applying the calculated scaling values and the calculated delay values to the audio signals of the virtual sound sources, and adding, for each loudspeaker in the array of loudspeakers, the component signals for this loudspeaker from each one of the plurality of virtual sound sources, so that a loudspeaker signal for each loudspeaker is obtained to which the plurality of virtual sound sources contribute, and, wherein the method further comprises the step of level correcting the audio signals of the virtual sound sources before being input into the wave field synthesis module or level correcting the component signals for the loudspeakers due to each virtual sound source before being added in the wave field synthesis module, the step of level correcting comprising:

determining, for each virtual sound source of the plurality of virtual sound sources, the correction value being based on a set amplitude state in the presentation region, the set amplitude state depending on a position of this virtual sound source or a type of this virtual sound source, and the correction value being also based on an actual amplitude state in the presentation region, the amplitude state in the presentation region beingbased on the component signals for the loudspeakers due to this virtual sound source as determined by the calculated scaling values and the calculated delay values, whereby a plurality of individual correction values are determined, each correction value being associated with one virtual sound source; and multiplying, for each virtual sound source of the plurality of virtual sound sources, the audio signal associated to the virtual sound source by the correction value associated with this virtual sound source before inputting the audio signal for this virtual sound source into the wave field synthesis module or multiplying the component signals for this virtual sound source by the correction value associated with this virtual sound source before being added to other component signals derived from a different virtual sound source in the wave field synthesis module, whereby a deviation between the set amplitude state and the actual amplitude state for each virtual sound source of the plurality of virtual sound sources is reduced.

* * * * *